US012576821B2

(12) United States Patent
Alenius et al.

(10) Patent No.: US 12,576,821 B2
(45) Date of Patent: Mar. 17, 2026

(54) CONTROL DEVICE AND METHOD FOR CONTROLLING TRAVELING SPEED OF A VEHICLE

(71) Applicant: Scania CV AB, Södertälje (SE)

(72) Inventors: Mikael Alenius, Segeltorp (SE);
Jonathan Adolfsson, Bandhagen (SE);
Tomas Backlund, Gothenburg (SE);
Gustav Lindberg, Stockholm (SE);
David Karlsson, Linghem (SE)

(73) Assignee: Scania CV AB, Södertälje (SE)

( * ) Notice: Subject to any disclaimer, the term of this patent is extended or adjusted under 35 U.S.C. 154(b) by 131 days.

(21) Appl. No.: 18/566,543

(22) PCT Filed: Jun. 8, 2022

(86) PCT No.: PCT/SE2022/050559
§ 371 (c)(1),
(2) Date: Dec. 1, 2023

(87) PCT Pub. No.: WO2023/277757
PCT Pub. Date: Jan. 5, 2023

(65) Prior Publication Data
US 2024/0270219 A1     Aug. 15, 2024

(30) Foreign Application Priority Data
Jun. 29, 2021     (SE) .................................... 2150826-2

(51) Int. Cl.
B60W 10/18     (2012.01)
B60T 8/17     (2006.01)
(Continued)

(52) U.S. Cl.
CPC ................ B60T 8/245 (2013.01); B60T 8/17 (2013.01); B60W 10/18 (2013.01);
(Continued)

(58) Field of Classification Search
CPC ........ B60T 8/245; B60T 8/17; B60T 2201/04; B60T 2250/04; B60T 2260/04;
(Continued)

(56) References Cited

U.S. PATENT DOCUMENTS 10,940,862 B1     3/2021   Dempsey et al.
2014/0180554 A1*  6/2014   Takahashi ............. B60W 40/10
                                                            701/70
2021/0070299 A1*  3/2021   Dempsey .......... B60W 50/0097

FOREIGN PATENT DOCUMENTS

DE     102014019543 A1     6/2015
EP         2808209 A1     12/2014
(Continued)

OTHER PUBLICATIONS

Jun. 29, 2022—(WO) International Search Report & Written Opinion—App. No. PCT/SE2022/050559.
(Continued)

*Primary Examiner* — Khoi H Tran
(74) *Attorney, Agent, or Firm* — Banner & Witcoff, Ltd.

(57)     ABSTRACT

A control device and a method for controlling traveling speed of a vehicle for the purpose of maintaining a vehicle speed equal to or lower than a pre-set downhill speed. The method comprises simulating a vehicle speed profile for an upcoming road section if braking at a pre-identified power level would currently be requested, thereby obtaining a predicted maximum vehicle speed and a predicted time until a vehicle speed equal to or within a pre-selected interval of the pre-set downhill speed is reached. The method further comprises, if the predicted maximum vehicle speed is equal to or below the pre-set downhill speed and the predicted time is below a preselected threshold time limit, requesting braking at the pre-identified power level or at an adjusted power level.

12 Claims, 3 Drawing Sheets

(51) Int. Cl.
   *B60T 8/24*        (2006.01)
   *B60W 30/18*       (2012.01)
   *B60L 7/10*        (2006.01)
   *B60W 10/198*      (2012.01)

(52) U.S. Cl.
   CPC   *B60W 30/18127* (2013.01); *B60W 30/18136*
            (2013.01); *B60L 7/10* (2013.01); *B60T*
         *2201/04* (2013.01); *B60T 2250/04* (2013.01);
            *B60W 10/198* (2013.01); *B60W 2552/15*
            (2020.02); *B60W 2710/18* (2013.01)

(58) Field of Classification Search
   CPC ...... B60T 1/087; B60T 2270/604; B60T 1/10;
            B60T 13/586; B60T 13/588; B60T 7/12;
            B60T 10/02; B60T 2270/60; B60W
            10/18; B60W 30/18127; B60W 30/18136;
            B60W 10/198; B60W 2552/15; B60W
            2710/18; B60W 2720/103; B60W 10/196;
            B60W 30/143; B60W 30/18109; B60W
            50/0097; B60W 30/146; B60W 2520/10;
            B60L 7/10; F16D 57/04; F16D 61/00;
                                            B60K 31/00

USPC ............................................... 701/70, 79, 80
See application file for complete search history.

(56)            References Cited

FOREIGN PATENT DOCUMENTS

| | | | |
|---|---|---|---|
| EP | 3000675 | A1 | 3/2016 |
| EP | 3121489 | A1 | 1/2017 |
| SE | 1450705 | A1 | 5/2015 |
| SE | 1850884 | A1 | 1/2020 |
| WO | 2013191614 | A1 | 12/2013 |
| WO | 2014003637 | A1 | 1/2014 |
| WO | 2014058383 | A2 | 4/2014 |

OTHER PUBLICATIONS

Oct. 23, 2020—(SE) Novelty Search—App. No. 2150826-2.
Feb. 7, 2022—(SE) Office Action—App. No. 2150826-2.
Jun. 29, 2022—(SE) Office Action—App. No. 2150826-2.
Apr. 7, 2025—(EP) Extended Search Report—App. No. 22833758.

* cited by examiner

CONTROL DEVICE AND METHOD FOR CONTROLLING TRAVELING SPEED OF A VEHICLE

CROSS-REFERENCE TO RELATED APPLICATIONS

The present application claims priority from and is a U.S. National Phase of International Application No. PCT/SE2022/050559, which was filed on Jun. 8, 2022, designating the United States of America and claiming priority to Swedish Patent Application No. 2150826-2, filed on Jun. 29, 2021. This application claims priority to and the benefit of the above-identified applications, which are all fully incorporated by reference herein in their entireties.

TECHNICAL FIELD

The present disclosure relates in general to a method for controlling traveling speed of a vehicle for the purpose of maintaining a vehicle speed equal to or lower than a pre-set downhill speed. The present disclosure further relates in general to a control device configured to control traveling speed of a vehicle for the purpose of maintaining a vehicle speed equal to or lower than a pre-set downhill speed. Moreover, the present disclosure relates in general to a computer program and to a computer-readable medium. Furthermore, the present disclosure relates in general to a vehicle.

BACKGROUND

Travelling speed of a vehicle, in particular a heavy vehicle such as a truck or a bus, may be affected by gravity on downhill gradients in such a way that the travelling speed increases. For this reason, many heavy vehicles are equipped with a downhill speed controller configured to control the travelling speed of the vehicle in accordance with a downhill speed control function. The downhill speed control function ensures that the travelling speed of the vehicle does not exceed a pre-set downhill speed. This is performed by controlling one or more auxiliary brake systems of the vehicle to apply braking torque for maintaining the traveling speed of the vehicle equal to or lower than the pre-set downhill speed. Examples of such auxiliary brake systems include various engine brakes systems, such as a compression release brake or an exhaust brake, or a retarder. Another example of an auxiliary brake system that may be used for this purpose is a regenerative brake. In general, braking by usage of the one or more auxiliary brake systems is automatically requested when the travelling speed of the vehicle approaches or reaches the pre-set downhill speed.

However, in some situations, the one or more auxiliary brake systems may not be able to deliver a sufficient braking torque for maintaining the downhill speed equal to or below the set downhill speed. In such cases, a driver may be required to brake the vehicle by usage of the service brakes. This in turn may increase the wear of the service brakes.

SE 1850884 A1 discloses an example of a method for controlling a motor vehicle comprising at least one auxiliary brake, wherein the braking force that the at least one brake is able to exert depends on an engine speed of the vehicle. Said method comprises acquiring road gradient data for a downhill slope ahead of the vehicle, simulating engine speed of the vehicle during travel in the downhill slope with the at least one auxiliary brake engaged and, based on at least the simulated engine speed, setting a target vehicle speed and a target gear for entering the downhill slope. The target vehicle speed and the target gear are set so that the engine speed will be maintained at or below a predefined maximum allowable engine speed throughout the downhill slope without gear shift in the downhill slope.

SUMMARY

The object of the present invention is to provide an improved method for controlling travelling speed of a vehicle for the purpose of maintaining a vehicle speed equal to or lower than a pre-set downhill speed.

The object is achieved by the subject-matter of the appended independent claim(s).

The present disclosure provides a method, performed by a control device, for controlling traveling speed of a vehicle for the purpose of maintaining a vehicle speed equal to or lower than a pre-set downhill speed. The vehicle comprises one or more auxiliary brake systems configured to brake the vehicle. The method comprises a step of simulating a vehicle speed profile for an upcoming road section if braking at a pre-identified power level by usage of the one or more auxiliary brake systems would currently be requested, thereby obtaining a predicted maximum vehicle speed for the upcoming road section and a predicted time until the vehicle reaches a vehicle speed equal to or within a pre-selected interval of the pre-set downhill speed for said pre-identified power level. The method further comprises a step of, if the predicted maximum vehicle speed is equal to or below the pre-set downhill speed and the predicted time is below a preselected threshold time limit, requesting braking of the vehicle by the one or more auxiliary brake systems at the pre-identified power level or at an adjusted power level, wherein said adjusted power level is derived by adjusting the pre-identified power level to compensate for a difference between said predicted maximum vehicle speed and the pre-set downhill speed.

The present method improves the possibility for maintaining a vehicle speed equal to or lower than the pre-set downhill speed. This is achieved by initiating braking the vehicle at an earlier stage than when the vehicle speed reaches the pre-set downhill speed as performed by conventional downhill speed controllers. The method may thus be described as resulting in a pre-braking of the vehicle. At the same time, braking of the vehicle by the one or more auxiliary brake systems is performed so as to avoid too low vehicle speeds. A too low vehicle speed may cause irritation to a driver of the vehicle or other road users. Furthermore, a too low vehicle speed may increase the duration for the vehicle to travel a designated route, which may be costly to an owner of the vehicle.

The present method relies on simulation of a vehicle speed profile for the upcoming road section under the condition that braking would be requested at a current point in time and at a pre-identified power level. Based on the result of said simulation, braking of the vehicle is requested when the conditions of the predicted maximum vehicle speed being equal to or lower than the pre-set downhill speed and the predicted time until the vehicle reaches a vehicle speed equal to or within a pre-selected interval of the pre-set downhill speed being below a preselected threshold time limit. Thus, there is no need to determine an appropriate time for requesting braking. This is because the method simply determines whether it is appropriate to request braking at the current point in time, and if so, requests braking at the pre-identified power level or at the adjusted power level. By means of considering the result of the simulation, it is ensured that the pre-identified power level is sufficient for maintaining the vehicle speed equal to or lower than the pre-set downhill speed and at the same time that the vehicle speed is not reduced too much when the vehicle travels the road section for which the simulation has been made.

The present method is especially advantageous in case of the vehicle comprising relatively weak auxiliary brakes which may not be able to deliver sufficient braking torque in all instances if relying on the ability to maintain the vehicle speed equal to or lower than the pre-set downhill speed by initiating braking when the vehicle reaches the pre-set downhill speed.

In view of the foregoing, the present method result in that the vehicle speed can be maintained equal to or lower than a pre-set downhill speed under an increased number of conditions compared to when using the above described previously known downhill speed controllers. More specifically, it can be used for an increased number of vehicle configurations, such as enabling usage of weaker auxiliary brake systems in a vehicle. Moreover, it may reduce the number of driving conditions of the vehicle where the auxiliary brake systems are not sufficient to maintain the pre-set downhill speed.

Since the method increases the number of situations where the vehicle speed may actually be maintained equal to or lower than the pre-set downhill speed, it also reduces the number of situations where it is necessary for a driver of the vehicle (if present) to utilize the service brakes for reducing the vehicle speed. Thus, the present invention may also reduce wear of the service brakes of the vehicle.

The preselected threshold time limit may be dependent of the pre-identified power level. This further improves the method since it ensures that the pre-identified power level is appropriate for braking of the vehicle under the specific conditions for the vehicle for the upcoming road section. More specifically, it ensures that the vehicle speed is not reduced too much.

The step of simulating a vehicle speed profile may comprise simulating a plurality of vehicle speed profiles, each vehicle speed profile corresponding to a respective pre-identified power level. Thereby, braking at different pre-identified power levels are simulated in parallel which in turn enables determining if the predicted maximum vehicle speed and the predicted time for each of the pre-identified power levels fulfils the condition for requesting braking at the corresponding pre-identified power level. This in turn also enables identifying the most appropriate power level for braking of the vehicle for the upcoming road section. Thus, this further improves the ability to maintain a vehicle speed equal to or lower than the pre-set downhill speed.

The step of requesting braking of the vehicle by the one or more auxiliary brake systems at the pre-identified power level or at the adjusted power level may be performed if it is predicted that the speed of the vehicle cannot be maintained equal to or below a pre-set downhill speed for the upcoming road section if braking of the vehicle by the one or more auxiliary brake systems would be requested when the pre-set downhill speed is reached. Thereby, the risk for increasing the total traveling time for a designated route of the vehicle is not unduly increased.

The one or more auxiliary brake systems may comprise at least one auxiliary brake whose deliverable braking torque is dependent of at least one propulsion unit of the vehicle. In such cases, the power that may be delivered by the one or more auxiliary brake systems during braking may be dependent of the driving conditions of the vehicle affecting the speed of the propulsion unit. This in turn affects the value of the pre-identified power level.

The vehicle may comprise a combustion engine and a gearbox. In such a case, the one or more auxiliary brake systems may comprise an engine brake system. In such a case, a power contribution of the engine brake system to the pre-identified power level may be defined by a maximum available power deliverable by the engine brake system for a pre-identified gear of the gearbox. By considering the maximum power deliverable by the engine brake system (dependent of the combustion engine), the power contribution thereof to the power level for which the simulation should be made may be more easily identified. More specifically, the power contribution of the engine brake system is directly dependent of the selection of gear in the gearbox. Furthermore, it is ensured that the engine brake system is efficiently used and at the appropriate point in time. Thereby, the total traveling time of the vehicle for a designated route is not unduly increased while at the same time enabling the vehicle speed to be maintained equal to or lower than the pre-set downhill speed.

The one or more auxiliary brake systems may comprise a regenerative brake system. In such a case, a power contribution of the regenerative brake system to the pre-identified power level may be defined by a percentage of the maximum regenerative power deliverable by the regenerative brake system. Thereby, the risk of damaging an energy storage device as a result of improper charging thereof during regenerative braking may be reduced. Moreover, charging of the energy storage device is more efficient at lower power levels, recovering more energy from braking and reducing the amount of energy which is lost as heat.

The present disclosure further provides a computer program comprising instructions which, when executed by a control device, cause the control device to carry out the method as described above.

Moreover, the present disclosure provides a computer-readable medium comprising instructions which, when executed by a control device, cause the control device to carry out the method as described above.

In accordance with the present disclosure, a control device configured to control traveling speed of a vehicle for the purpose of maintaining a vehicle speed equal to or lower than a pre-set downhill speed is also provided. Said vehicle comprises one or more auxiliary brake systems configured to brake the vehicle. The control device is configured to simulate a vehicle speed profile for an upcoming road section if braking at a pre-identified power level by usage of the one or more auxiliary brake systems would currently be requested, thereby obtaining a predicted maximum vehicle speed for the upcoming road section and a predicted time until the vehicle reaches a vehicle speed equal to or within a pre-selected interval of the pre-set downhill speed for said pre-identified power level. The control device is further configured to, if the predicted maximum vehicle speed is equal to or below the pre-set downhill speed and the predicted time is below a preselected threshold time limit, request braking of the vehicle by the one or more auxiliary brake systems at the pre-identified power level or at an adjusted power level. Said adjusted power level is derived by adjusting the pre-identified power level to compensate for a difference between said predicted maximum vehicle speed and the pre-set downhill speed.

The control device provides the same advantages as described above with regard to the corresponding method for controlling traveling speed of a vehicle.

The control device may further be configured to simulate a plurality of vehicle speed profiles, each vehicle speed profile corresponding to a respective pre-identified power level.

The control device may further be configured to identify one or more power levels for which a simulation of vehicle speed profile for the upcoming road section should be made.

The control device may further be configured to predict whether the speed of the vehicle may be maintained equal to or below the pre-set downhill speed for the upcoming road section if braking of the vehicle by the one or more auxiliary brake systems would be requested when the pre-set downhill speed is reached.

The present disclosure further provides a vehicle comprising the control device described above. The vehicle may be a heavy land-based vehicle, such as a truck or a bus. The vehicle may for example be a combustion engine driven vehicle, a hybrid vehicle or a fully electric vehicle.

DETAILED DESCRIPTION

Figure 1:
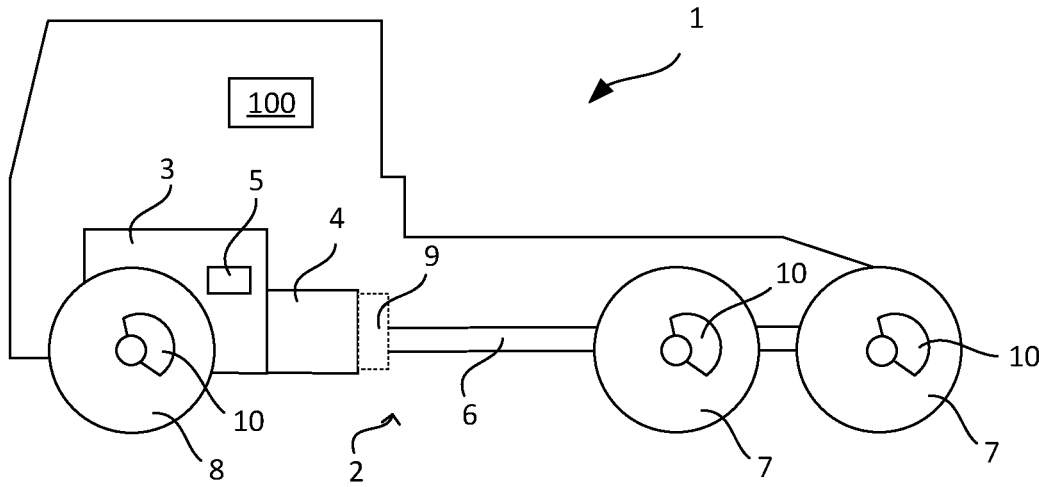
FIG. 1 schematically illustrates a side view of an example of a vehicle.

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

In the present disclosure, the terms "traveling speed of a vehicle" and "vehicle speed" are used interchangeably and should therefore be considered to have the same meaning. However, a distinction is made between an actual vehicle speed and a predicted vehicle speed. A predicted vehicle speed (including a predicted maximum vehicle speed) is not an actual current vehicle speed but a calculated or estimated future vehicle speed.

The present disclosure provides a method for controlling traveling speed of a vehicle for the purpose of maintaining a vehicle speed equal to or lower than a pre-set downhill speed. The method is performed by a control device configured therefore. More specifically, it relates to a method for controlling traveling speed of a vehicle for the purpose of maintaining a vehicle speed equal to or lower than a pre-set downhill speed for an upcoming road section. Said upcoming road section may comprise one or more downhill sections, but is not limited thereto. The method may in fact be utilized irrespectively of the gradient of the upcoming road section. The pre-set downhill speed may be a downhill speed selected by a driver (including a driver remote from the vehicle in case of an autonomous vehicle) or by a cruise control system (comprising a downhill speed controller) of the vehicle. Alternatively, the pre-set downhill speed may be a speed defined by legal requirements relating to the road (such as the speed limit of the road), in which case such speed may be set by the control device or another control system of the vehicle as the pre-set downhill speed.

The vehicle whose travelling speed is controlled by means of the present method comprises one or more auxiliary brake systems configured to brake the vehicle. The one or more auxiliary brake systems may be used for controlling the traveling speed of the vehicle. Examples of such auxiliary brake systems include a retarder or an engine brake system. An engine brake system is in the present disclosure considered to mean a braking system which utilizes a propulsion unit of the vehicle to provide a braking effect and the thereby slow down the vehicle. Thus, engine brake systems is in the present disclosure considered to include for example a compression release brake (CRB) system and an exhaust brake system in case the vehicle comprises a combustion engine. Furthermore, in the present disclosure, an engine braking system is also considered to encompass a regenerative brake system in case the vehicle comprises an electrical machine. In a regenerative brake system, the electrical machine is operated as a generator whereby kinetic energy of the vehicle may be converted to electrical energy and thereby slow down the travelling speed of the vehicle. The present method is particularly advantageous when used in vehicles comprising at least one auxiliary brake system whose deliverable braking torque is dependent of the speed of at least one propulsion unit of the vehicle, such as a compression release brake, an exhaust brake and/or a regenerative brake system.

The method comprises a step of simulating a vehicle speed profile for an upcoming road section if braking at a pre-identified power level, by usage of the one or more auxiliary brake systems, would currently be requested. In other words, the simulation of the vehicle speed profile is made based on the condition that braking would currently be requested (from the one or more auxiliary brake systems) at the pre-identified power level. From the simulated vehicle speed profile, a predicted maximum vehicle speed for the upcoming road section and a predicted time until the vehicle reaches a vehicle speed equal to or within a pre-selected interval of the pre-set downhill speed are obtained. Said predicted maximum vehicle speed and predicted time, obtained from the simulated vehicle speed profile, thus apply for the pre-identified power level for which the simulation has been performed.

As mentioned above, the simulation is performed based on the condition that braking would currently be requested. It should here be noted that the actual application of braking power from one or more auxiliary brake systems when a request therefore has been generated occurs with a certain delay depending for example on the auxiliary brake(s) as such. Furthermore, the actual simulation may also cause a certain delay. However, such factors may easily be considered when performing the simulation. When discussed herein, the expression "if braking . . . would currently be requested" or similar expressions should therefore be interpreted as taking into account such delaying factors in the actual application of braking power by the one or more auxiliary brakes. However, the present method does not comprise any prediction as to when the request for braking at the pre-identified power level should be generated, but uses the condition of the request being generated at the current point in time (suitably taking into account the delaying factors mentioned above).

Simulation of a vehicle speed profile for an upcoming road section per se is nowadays well known to a person skilled in the art and will therefore not be described in detail here. Examples of factors that may typically be considered in such a simulation, in addition to geographical data (including topography) relating to the upcoming road section, include for example current vehicle speed, vehicle configuration, vehicle load etc. Advanced simulations of vehicle speed profiles may also take into consideration additional factors, such as weather conditions and/or traffic conditions. In accordance with the herein described method, the simulation of the vehicle speed profile is performed under the condition of braking the vehicle by means of the one or more auxiliary brake systems at a pre-identified power level as mentioned above.

The simulation of the vehicle speed profile may in practice be performed for a road section having an arbitrary length. However, the road section should preferably not be too short so as to risk giving an inaccurate result and unsuitable driving conditions of the vehicle for a subsequent road section. Therefore, the road section for which the simulation of the vehicle speed profile is made may suitably be at least 400 meters, preferably at least 800 meters. Moreover, the simulation need not be made for road sections longer than about 5 km (albeit possible, if desired) as this increases the computational efforts needed and is not necessary. The simulation may also be performed for different lengths of road sections depending on other factors, for example dependent of the current vehicle speed, if desired.

The pre-identified power level may be, depending on the circumstances, a pre-identified power level of only one auxiliary brake system or a pre-identified power level constituting a sum of the power levels provided by a plurality of the one or more brake system. The pre-identified power level may for example correspond to a maximum power level deliverable by one or more auxiliary brake systems or a percentage of a maximum power level deliverable by the one or more auxiliary brake systems, as will be explained in more detail below.

According to a first alternative, the method further comprises a step of, if the predicted maximum vehicle speed is equal to or below the pre-set downhill speed and the predicted time is below a preselected threshold time limit, requesting braking of the vehicle by the one or more auxiliary brake systems at the pre-identified power level. Said request for braking of the vehicle is generated as soon as it has been determined that the above-mentioned conditions regarding predicted maximum vehicle speed and predicted time are fulfilled. According to a second alternative, the method further comprises, if the predicted maximum vehicle speed is equal to or below the pre-set downhill speed and the predicted time is below a preselected threshold time limit, requesting braking of the vehicle by the one or more auxiliary brake systems at an adjusted power level. Said adjusted power level is derived by adjusting the pre-identified power level to compensate for a difference between said predicted maximum vehicle speed and the pre-set downhill speed. Thus, the adjusted power level is generally lower than the pre-identified power level. Similarly to the first alternative, the request for braking of the vehicle is according to the second alternative generated as soon as it has been determined that the above-mentioned conditions regarding predicted maximum vehicle speed and predicted time are fulfilled (and the adjusted power level has been derived). The second alternative has the advantage of allowing the vehicle speed to more closely meet the pre-set downhill speed in case of the pre-identified power level resulting in more braking of the vehicle than needed in order to avoid that the vehicle speed increases above the pre-set downhill speed. Therefore, it also reduces the risk of increased total traveling time for a route of the vehicle. However, this also requires a step of calculating an adjusted power level, and therefore increases the computational efforts needed and may possibly introduce a risk for errors.

As already discussed above, a predicted time until the vehicle reaches a vehicle speed equal to or within a pre-selected interval of the pre-set downhill speed is obtained from the simulated vehicle speed profile. Said pre-selected interval may for example be defined by a percentage of the pre-set downhill speed or may be a fixed value, as desired. The pre-selected interval is defined by the pre-set downhill speed as a maximum vehicle speed value and as well as a pre-selected lower bound vehicle speed. Furthermore, the pre-selected interval may for example at most 10 km/h, preferably at most 5 km/h, most preferably 3 km/h or less.

Furthermore, as previously mentioned, two conditions must be met for the method to request braking of the vehicle at the pre-identified power level or the adjusted power level. Firstly, the predicted maximum vehicle speed for the upcoming road section must be equal to or below the pre-set downhill speed. This condition ensures that the vehicle speed is maintained equal to or below the pre-set downhill speed. In other words, it ensures that the pre-identified power level is sufficient for maintaining the vehicle speed equal to or below the pre-set downhill speed. Secondly, the predicted time until the vehicle reaches a vehicle speed equal to or within a pre-selected interval of the pre-set downhill speed must be below a preselected threshold time limit. Said preselected threshold time limit may be dependent of the pre-identified power level, which means that different pre-identified power levels may have different preselected threshold time limits. This is because it may be acceptable to start to brake at an earlier point in time if a higher pre-identified power level is necessary to maintaining the vehicle speed equal to or below the pre-set downhill speed. The fact that the predicted time until the vehicle reaches a vehicle speed equal to or within a pre-selected interval of the pre-set downhill speed must be below a preselected threshold time limit ensures that the vehicle speed is not reduced too much. More specifically, by applying the condition that the predicted time until the vehicle reaches a vehicle speed equal to or within a pre-selected interval of the pre-set downhill speed has to be below the preselected threshold time limit, it is ensured that braking is not initiated too early so that the vehicle would be unduly braked. If braking would be initiated too early at the pre-identified power level or the adjusted power level, the vehicle speed would become too low. This could in turn cause irritation to the driver as well as other road users. Furthermore, this could unduly increase the total traveling time for a route of the vehicle, which in turn may negatively affect the economy for an owner of the vehicle.

The above-described step of simulating a vehicle speed profile for an upcoming road section if braking at a pre-determined power level would currently be requested may be performed essentially continuously or a pre-selected time intervals. These pre-selected time intervals could preferably be relatively short so as to take into account the changing conditions for the vehicle, such as current vehicle speed and change in upcoming road section. In other words, it is not intended for the vehicle to travel the whole road section for which a vehicle speed profile has been simulated at a first simulation before the next simulation for an upcoming road section is performed. For example, the step of simulating a vehicle speed profile may be performed once every second or every other second. Preferably, the duration between two consecutive simulations of vehicle speed profile for an upcoming road section is not more than 5 seconds. This also means that a predicted maximum vehicle speed and a predicted time is derived from the vehicle speed profiles at the same time intervals and that, if the conditions for the predicted maximum vehicle speed and predicted time are met, that the request for braking at the pre-identified power level or the adjusted power level (corresponding to the simulated vehicle speed profile) may be generated.

Furthermore, a plurality of the above-described simulation of a vehicle speed profile for an upcoming road section may in accordance with the present method be performed in parallel, wherein said plurality of simulations are made for different pre-identified power levels. In other words, the step of simulating a vehicle speed profile may comprise simulating a plurality of vehicle speed profiles in parallel, each vehicle speed profile corresponding to a respective pre-identified power level. For example, two, three or four separate vehicle speed profiles may be simulated in parallel. Here it should be noted that a plurality of simulations performed in parallel is considered to mean that the plurality of simulations of vehicle speed profile are performed simultaneously in contrast to the above-described consecutive simulations of vehicle speed profile at pre-selected time intervals. The method may however comprise both simulating a plurality of vehicle speed profiles in parallel as well as at pre-selected time intervals, i.e. consecutive simulations.

When the method comprises simulating a plurality of vehicle speed profiles in parallel, each of the vehicle speed profiles for the (same) upcoming road section is simulated for a case where braking would currently be requested by usage of the one or more auxiliary brake systems, but at a respective pre-identified power level. In other words, different pre-identified power levels are used for the parallel simulations. Thus, from each of the simulated vehicle speed profiles, a respective predicted maximum vehicle speed for the upcoming as well as predicted time until the vehicle reaches a vehicle speed equal to or within a pre-selected interval of the pre-set downhill speed may be obtained. Thereafter, the method may comprise a step of determining, for each of the vehicle speed profiles (corresponding to a respective pre-identified power level), if the predicted maximum vehicle speed is equal to or below the pre-set downhill speed and the predicted time is below a preselected threshold time limit. In case the predicted maximum vehicle speed is above the pre-set downhill speed and/or the predicted time is equal to or above a preselected threshold time limit for one of the simulated vehicle speed profiles, the pre-identified power level corresponding to said vehicle speed profile is not an appropriate for a current request of braking and can therefore be deselected. In case none of vehicle speed profiles simulated in parallel fulfil the criteria of the maximum vehicle speed being equal to or less than the pre-set downhill speed, and one of said vehicle speed profiles are simulated for a pre-identified power level corresponding to the maximum power level achievable by the one or more auxiliary brake systems, the method may comprise requesting braking at the maximum power level achievable by the one or more brake systems. In such a case, although the pre-set downhill speed will likely not be maintained, the need for usage of the service brakes may be reduced. However, in case the predicted maximum vehicle speed is equal to or below the pre-set downhill speed and the predicted time is below a preselected threshold time limit for one of the vehicle speed profiles, the method may comprise selecting the pre-identified power level corresponding to said vehicle speed profile and request braking of the vehicle at said selected pre-identified power level. Naturally, the method may alternatively comprise requesting braking of the vehicle at an adjusted power level, derived by adjusting the selected pre-identified power level to compensate for a difference between said predicted maximum vehicle speed and the pre-set downhill speed, in the same way as described above.

In the unlikely event that two of the simulated vehicle speed profiles, simulated in parallel, both result in the condition of both the predicted maximum vehicle speed being equal to or below the pre-set downhill speed and the predicted time being below a preselected threshold time limit, the method may comprise selecting the pre-identified power level corresponding to the vehicle speed profile which has a maximum vehicle speed closest to the pre-set downhill speed.

According to one exemplifying embodiment of the method described herein, the step of requesting braking of the vehicle by the one or more auxiliary brake systems at the pre-identified power level or the adjusted power level is only performed if it predicted that the speed of the vehicle cannot be maintained equal to or below the pre-set downhill speed for the upcoming road section if braking of the vehicle by one or more auxiliary systems would be requested when the vehicle approaches the pre-set downhill speed. In other words, the request of braking of the vehicle at the pre-identified power level or adjusted power level as described above would according to this exemplifying embodiment only be requested in case a conventional downhill speed control function, wherein braking is initiated when the vehicle speed essentially reaches the pre-set downhill speed, is not sufficient for maintaining the vehicle speed equal to or lower than the pre-set downhill speed. This could be the case where the one or more auxiliary brake systems are not able to deliver sufficient braking torque for maintaining the vehicle speed equal to or lower than the pre-set downhill speed when the vehicle reaches the pre-set downhill speed. It should be noted that the step of simulating a vehicle speed profile for the upcoming road section may still be made if it is predicted that the vehicle speed may be maintained equal to or lower than the pre-set downhill speed also if braking would be requested when the vehicle speed approaches the pre-set downhill speed. However, the step of requesting braking of the vehicle at the pre-identified power level or the adjusted power level may be inhibited in such cases.

As already discussed above, the method comprises simulating a vehicle speed profile for an upcoming road section under the condition that braking at a pre-identified power level would currently be requested. Said pre-identified power level may be defined by the power level of only one auxiliary brake system (irrespectively of the if the vehicle comprises one or a plurality of auxiliary brake systems) or of the sum of power levels from different auxiliary brake systems of the vehicle. Thus, each of the one or more auxiliary brake systems may provide a power contribution to the pre-identified power level used in the simulation of a vehicle speed profile for an upcoming road section. Moreover, for some auxiliary brake systems of a vehicle, the deliverable braking torque therefrom is dependent of the speed of the propulsion unit, with the maximum deliverable braking torque generally increasing with increasing speed of the propulsion unit. Thus, the pre-identified power level may in such cases be dependent of the speed of the propulsion unit.

Considering for example a vehicle comprising a combustion engine, a gearbox and an engine brake system (such as a compression release brake or an exhaust brake), the deliverable braking torque by the engine brake system will be dependent of the speed of the combustion engine, which in turn is dependent of the selection of gear in the gearbox. In such cases, the power contribution of the engine brake system to the pre-identified power level may be defined by a maximum available power deliverable by the engine brake system for a pre-identified gear of the gearbox. In essence, the power contribution of the engine brake system to the pre-identified power level is thus in such a case directly dependent of gear selection in view of considering the maximum available power deliverable by the engine brake system when identifying power level for the simulation. In case of performing a plurality of parallel simulations, the power contribution of the engine brake system to the different pre-identified power levels for which a simulation of vehicle speed profile for an upcoming road section may be defined by different gears of the gearbox. This in turn leads to different maximum available power levels deliverable by the engine brake system as a result of different speeds of the combustion engine.

Considering another example wherein the one or more auxiliary brake systems comprises a regenerative brake system, the power contribution of the regenerative brake system to the pre-identified power level may be defined by a percentage of the maximum regenerative power deliverable by the regenerative brake system. During regenerative braking, an energy storage device of the vehicle may be charged by the conversion of the kinetic energy to electrical energy when the electrical machine is operated as a generator. However, it is not always appropriate to charge the energy storage device at a maximum charging rate as this may deteriorate the energy storage device and thereby shorten the service life thereof. Furthermore, higher charge rates lead to less efficiency and more energy being wasted as heat. Therefore, in practice, there are often limitations as to the charging rate of the energy storage device and therefore also to the deliverable power from the regenerative brake system. Therefore, in contrast to auxiliary brake systems dependent of a combustion engine, it may be more appropriate to use a power contribution of the regenerative brake system which is lower than the maximum regenerative power deliverable by the regenerative system when identifying the power contribution thereof to the pre-identified power level.

The performance of the herein described method for controlling traveling speed of a vehicle may be governed by programmed instructions. These programmed instructions typically take the form of a computer program which, when executed in or by a control device, causes the control device to effect desired forms of control action. Such instructions may typically be stored on a computer-readable medium.

The present disclosure further relates to a control device configured to control traveling speed of a vehicle in accordance with the method described above. The control device may be configured to perform any one of the steps of the method for controlling traveling speed of a vehicle as described herein.

More specifically, the present disclosure provides a control device configured to control traveling speed of a vehicle for the purpose of maintaining a vehicle speed equal to or lower than a pre-set downhill speed. Said vehicle comprises one or more auxiliary brake systems configured to brake the vehicle. The control device is configured to simulate a vehicle speed profile for an upcoming road section if braking at a pre-identified power level by usage of the one or more auxiliary brake systems would currently be requested, thereby obtaining a predicted maximum vehicle speed for the upcoming road section and a predicted time until the vehicle reaches a vehicle speed equal to or within a pre-selected interval of the pre-set downhill speed for said pre-identified power level. The control device is further configured to, if (and when) the predicted maximum vehicle speed is equal to or below the pre-set downhill speed and the predicted time is below a preselected threshold time limit, request braking of the vehicle by the one or more auxiliary brake systems at the pre-identified power level or at an adjusted power level. Said adjusted power level is derived by adjusting the pre-identified power level to compensate for a difference between said predicted maximum vehicle speed and the pre-set downhill speed.

The control device may further be configured to determine the adjusted power level by adjusting the pre-identified power level (for which the simulation has been made and at which the request for braking of the vehicle is to be made, if the conditions of maximum vehicle speed and predicted time are met) to compensate for a difference between the predicted maximum vehicle speed and the pre-set downhill speed. More specifically, the control device may be configured to determine the adjusted power level by reducing the pre-identified power level so that a predicted maximum vehicle speed in case of braking at the adjusted power level is closer to the pre-set downhill speed compared to a predicted maximum vehicle speed if braking at the pre-identified power level.

The control device may further be configured to identify one or more power levels for which a simulation of a vehicle speed profile for the upcoming road section should be made. For said purpose, the control device may be configured to identify one or more power levels that are the most likely power levels appropriate for braking the vehicle based on the current driving conditions of the vehicle and/or the data relating to the upcoming road section (such as gradient). The control device may be configured to make such an identification of power levels in accordance with any previously known method for identifying possible braking power levels for a vehicle for an upcoming road section. For example, in case of an auxiliary brake system whose deliverable braking torque is dependent on speed of the combustion engine, the control device may be configured to identify appropriate gear selection and thereby arrive at a power contribution from said auxiliary brake system to an appropriate power level which is to be simulated. Such a gear could be a current gear or a gear to which it is possible to shift under the current driving conditions of the vehicle.

The control device may comprise one or more control units. In case the control device comprises a plurality of control units, each control unit may be configured to control a certain function/action or a certain function/action may be divided between more than one control units. The control device may be a control device of the vehicle. Alternatively, one or more control units of the control device may be arranged remote from the vehicle, for example at a remote control center or the like.

The present disclosure also relates to a vehicle comprising the above-described control device. The vehicle may further comprise one or more auxiliary brake systems configured to brake the vehicle. The vehicle may for example be a land-based heavy vehicle, such as a truck or a bus, but is not limited thereto. The vehicle may be a vehicle driven by a combustion engine only. Alternatively, the vehicle may be a hybrid vehicle in which case the vehicle comprises an electrical machine in addition to a combustion engine. The vehicle may also be a fully electrical vehicle in which case it does not comprise a combustion engine. Such an electrical vehicle may comprise one or more electrical machines which may be operated as a regenerator for the purpose of providing a regenerative brake system to the vehicle.

FIG. 1 schematically illustrates a side view of an example of a vehicle 1, here illustrated as a truck. The vehicle 1 comprises a powertrain 2 comprising a combustion engine 3 serving as a propulsion unit, and a gearbox 4. The gearbox 4 may be connected to the driving wheels 7 of the vehicle 1 via an output shaft 6 of the gearbox 4. The vehicle may comprise service brakes 10 arranged at the respective driving wheels 7, and preferably also at non-driving wheels 8. The vehicle 1 may further comprise at least one auxiliary brake system 5 whose deliverable braking power is dependent of the speed of the combustion engine 3; for example a compression release brake system, or an exhaust brake system. The vehicle 1 may optionally comprise an auxiliary brake system whose deliverable braking power is independent of the speed of the combustion engine, such as a retarder 9. Such a retarder 9 may for example be connected to an output shaft of the gearbox 4 as illustrated in the figure. Alternatively, the retarder may be connected to a shaft of the combustion engine.

As previously mentioned, the present disclosure is not limited to a vehicle driven by a combustion engine. The vehicle 1 may additionally, or alternatively, comprise one or more electrical machines (not shown). In case the vehicle comprises at least one electrical machine, the vehicle may also comprise an auxiliary brake system in the form of a regenerative brake system (not shown).

The vehicle may further comprise a control device 100 configured to control traveling speed of the vehicle for the purpose of maintaining a vehicle speed equal to or lower than a pre-set downhill speed. Said control device 100 may be configured to control the one or more auxiliary brake systems of the vehicle 1.

Figure 2:
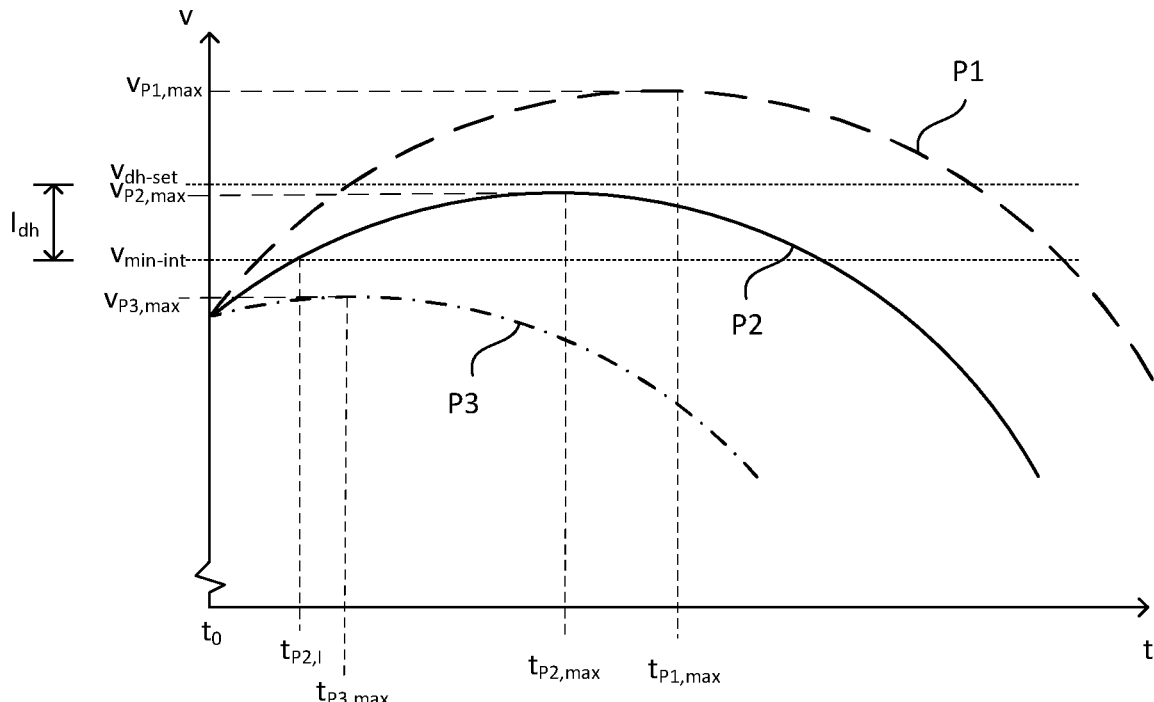
FIG. 2 schematically illustrates an example of a result of simulation of vehicle speed profile for an upcoming road section (for three different pre-identified power levels) if braking would currently be requested.

FIG. 2 schematically illustrates an example of a result of simulation of vehicle speed profile for an upcoming road section, for three different pre-identified power levels P1, P2, P3, if braking would currently be requested. Thus, three different simulations of vehicle speed profile has been made in parallel and are thus valid for the same upcoming road section. The figure illustrates predicted vehicle speed v over time t, and the parallel simulations are performed for a current request for braking at $t_0$. As shown in the figure, the maximum predicted vehicle speed $v_{P1,max}$ for pre-identified power level P1 is above the pre-set downhill speed $v_{dh-set}$. In other words, for the pre-identified power level P1, the predicted maximum vehicle speed $v_{P1,max}$ does not fulfil the condition of being equal to or lower than the pre-set downhill speed $v_{dh-set}$. However, both of the pre-identified power levels P2 and P3 result in a respective predicted maximum vehicle speed $v_{P2,max}$, $v_{P3,max}$ being equal to or lower than the pre-set downhill speed $v_{dt-set}$ as shown in the figure. The predicted maximum speed for the different pre-identified power levels P1, P2, P3 are predicted to be reached at the point in time $t_{P1,max}$, $t_{P2,max}$ and $t_{P3,max}$, respectively.

However, the predicted maximum vehicle speed $v_{P3,max}$ for pre-identified power level P3 is not within a pre-selected interval $I_{dh}$ of the pre-set downhill speed $v_{dh-set}$ as shown in the figure. Said pre-identified interval $I_{dh}$ is defined by an upper bound constituting the pre-set downhill speed $v_{dh-set}$ and a lower bound $v_{min-int}$ in the figure. In other words, the vehicle is predicted not reach a vehicle speed equal to or within the pre-selected interval $I_{dh}$ of the pre-set downhill speed for the upcoming road section in case of braking a pre-identified power level P3. Therefore, the pre-identified power level P3 cannot fulfil the condition of the predicted time until the vehicle reaches a vehicle speed equal to or within the pre-selected interval $I_{dh}$ of the pre-set downhill speed being below a pre-selected threshold time limit. Described differently, a predicted time until the vehicle reaches a vehicle speed equal to or within the pre-selected interval $I_{dh}$ of the pre-set downhill speed for the upcoming road section in case of braking a pre-identified power level P3 would be infinity long.

Thus, based on the result of the simulations shown in FIG. 2, a request for braking of the vehicle at the pre-identified power level P2 would therefore be generated in accordance with the present method as long as the time between $t_0$ and the predicted time $t_{P2,I}$ until the vehicle reaches a vehicle speed within the pre-selected interval $I_{dh}$ is below the preselected threshold time limit.

Figure 3:
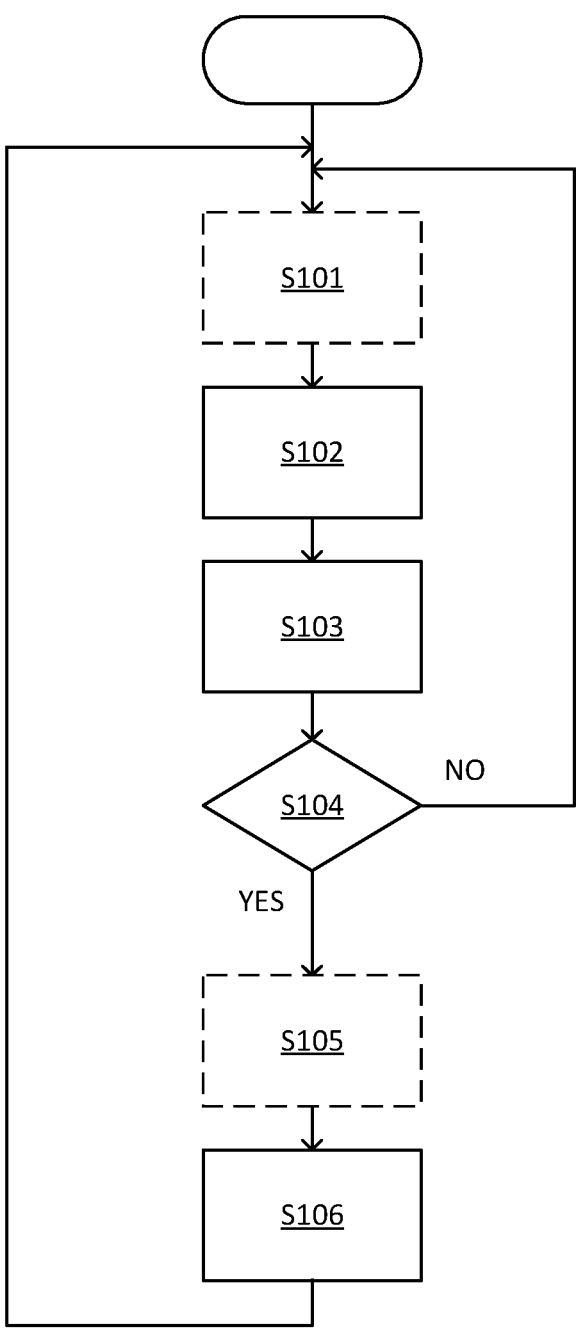
FIG. 3 represents a flowchart schematically illustrating one exemplifying embodiment of the method for controlling traveling speed of a vehicle for the purpose of maintaining a vehicle speed equal to or lower than a pre-set downhill speed in accordance with the present disclosure, FIG. 4 schematically illustrates an exemplifying embodiment of a device that may comprise, consist of, or be comprised in a control device configured for controlling traveling speed of a vehicle for the purpose of maintaining a vehicle speed equal to or lower than a pre-set downhill speed.

FIG. 3 represents a flowchart schematically illustrating one exemplifying embodiment of the method for controlling traveling speed of a vehicle for the purpose of maintaining a vehicle speed equal to or lower than a pre-set downhill speed in accordance with the present disclosure.

The method may comprise a step S101 of identifying one or more power levels by which the vehicle may possibly be braked by usage of one or more auxiliary brake systems of the vehicle. This may be made based on the current driving conditions of the vehicle. Thereby, one or more pre-identified power levels may be obtained.

The method comprises a step S102 of simulating at least one vehicle speed profile for an upcoming road section if braking, at a pre-identified power level, by usage of the one or more auxiliary brake systems would currently be requested.

The method further comprises a step S103 of, from the at least one simulated vehicle speed profile provided in step S102, obtaining a predicted maximum vehicle speed for the upcoming road section as well as a predicted time until the vehicle reaches a vehicle speed equal to or within a pre-selected speed interval of the pre-set downhill speed. Said predicted maximum vehicle speed and predicted time thus apply to a case of braking at the pre-identified power level for which the vehicle speed profile has been simulated.

The method further comprises a step S104 of determining if the predicted maximum vehicle speed is equal to or below the pre-set downhill speed and the predicted time is below a preselected threshold time limit. If the predicted maximum vehicle speed is not equal to or below the pre-set downhill speed and/or the predicted time is not below the preselected threshold time limit, the method is reverted to start. However, if the predicted maximum vehicle speed is equal to or below the pre-set downhill speed and the predicted time is below a preselected threshold time limit, the method proceeds to subsequent step S105 (if present) or step S106 (if step S105 not present).

The method may optionally comprise a step S105 of deriving/calculating an adjusted power level by adjusting the pre-identified power level, for which the conditions regarding predicted maximum vehicle speed and predicted time in step S104 are determined to have been met, to compensate for a difference between the predicted maximum vehicle speed and the pre-set downhill speed.

The method further comprises a step S106 of requesting braking of the vehicle by the one or more auxiliary brake systems at the pre-identified power level for which the conditions regarding predicted maximum vehicle speed and predicted time in step S104 are determined to be have been met. Alternatively, in case the method comprises the step S105, step S106 comprising requesting braking of the vehicle by the one or more brake systems at the adjusted power level.

After step S106, the method may be reverted back to start.

Figure 4:
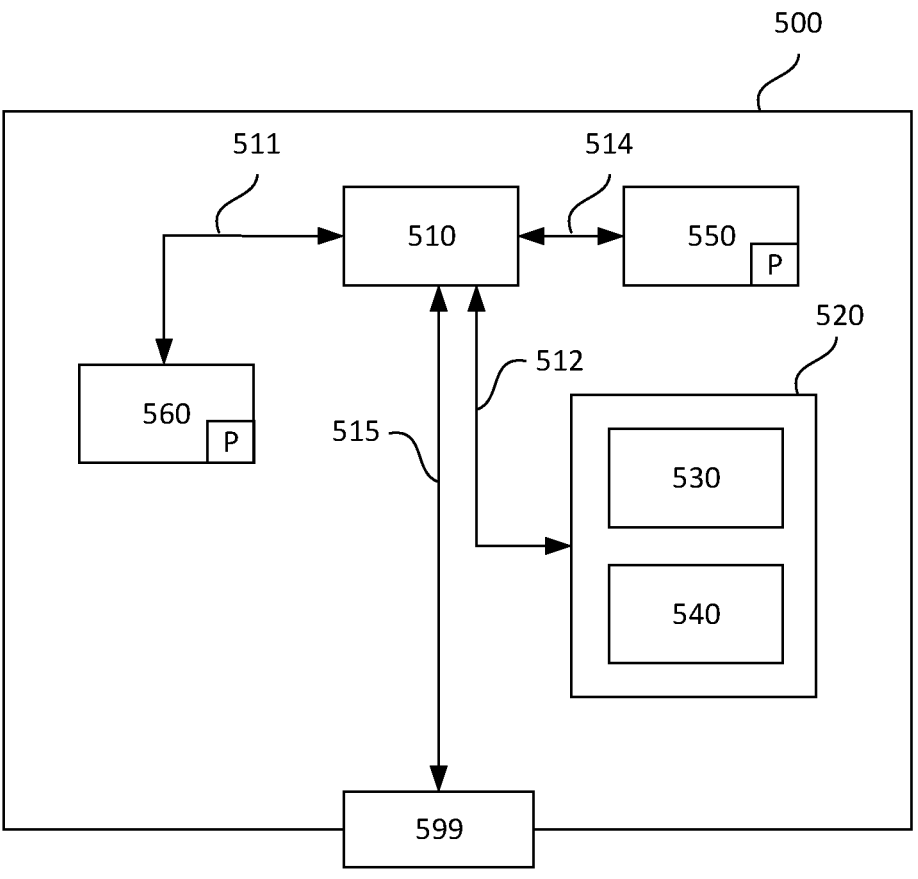

FIG. 4 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for controlling traveling speed of a vehicle (which comprises one or more auxiliary brake systems configured to brake the vehicle) for the purpose of maintaining a vehicle speed equal to or lower than a pre-set downhill speed. The computer program comprises instructions for simulating a vehicle speed profile for an upcoming road section if braking at a pre-identified power level by usage of the one or more auxiliary brake systems would currently be requested, thereby obtaining a predicted maximum vehicle speed for the upcoming road section and a predicted time until the vehicle reaches a vehicle speed equal to or within a pre-selected interval of the pre-set downhill speed for said pre-identified power level. The computer program further comprises instructions for, if the predicted maximum vehicle speed is equal to or below the pre-set downhill speed and the predicted time is below a preselected threshold time limit, requesting braking of the vehicle by the one or more auxiliary brake systems at the pre-identified power level or at an adjusted power level. Said adjusted power level is derived by adjusting the pre-identified power level to compensate for a difference between said predicted maximum vehicle speed and the pre-set downhill speed.

The program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be affected by the device 500 by means of the data processing unit 510 which runs the program stored in the memory 560 or the read/write memory 550. When the device 500 runs the program, methods herein described are executed.

The invention claimed is:

1. A method, performed by a control device, for controlling traveling speed of a vehicle for the purpose of maintaining a vehicle speed equal to or lower than a pre-set downhill speed, the vehicle comprising:

one or more auxiliary brake systems configured to brake the vehicle;

the method comprising the following steps:

simulating a vehicle speed profile for an upcoming road section if braking at a pre-identified power level by usage of the one or more auxiliary brake systems would currently be requested, thereby obtaining a predicted maximum vehicle speed for the upcoming road section and a predicted time until the vehicle reaches a vehicle speed equal to or within a pre-selected interval of the pre-set downhill speed for said pre-identified power level, if the predicted maximum vehicle speed is equal to or below the pre-set downhill speed and the predicted time is below a preselected threshold time limit, requesting braking of the vehicle by the one or more auxiliary brake systems at the pre-identified power level or at an adjusted power level, wherein the adjusted power level is derived by adjusting the pre-identified power level to compensate for a difference between said predicted maximum vehicle speed and the pre-set downhill speed.

2. The method according to claim 1, wherein the preselected threshold time limit is dependent of the pre-identified power level.

3. The method according to claim 1, wherein the step of simulating a vehicle speed profile comprises simulating a plurality of vehicle speed profiles, each vehicle speed profile corresponding to a respective pre-identified power level.

4. The method according to claim 1, wherein the step of requesting braking of the vehicle by the one or more auxiliary brake systems at the pre-identified power level or at the adjusted power level is performed if it is predicted that the speed of the vehicle cannot be maintained equal to or below the pre-set downhill speed for the upcoming road section if braking of the vehicle by the one or more auxiliary brake systems would be requested when the pre-set downhill speed is reached.

5. The method according to claim 1, wherein the one or more auxiliary brake systems comprises at least one auxiliary brake system whose deliverable braking torque is dependent of at least one propulsion unit of the vehicle.

6. The method according to claim 1, wherein the vehicle comprises a combustion engine and a gearbox, the one or more auxiliary brake systems comprises an engine brake system, and a power contribution of the engine brake system to the pre-identified power level is defined by a maximum available power deliverable by the engine brake system for a pre-identified gear of the gearbox.

7. The method according to claim 1, wherein the one or more auxiliary brake systems comprises a regenerative brake system, and wherein a power contribution of the regenerative brake system to the pre-identified power level is defined by a percentage of the maximum regenerative power deliverable by the regenerative brake system.

8. A non-transitory computer-readable medium comprising instructions which, when executed by a control device, cause the control device to carry out the method according to claim 1.

9. A control device configured to control traveling speed of a vehicle for the purpose of maintaining a vehicle speed equal to or lower than a pre-set downhill speed, the vehicle comprising:

one or more auxiliary brake systems configured to brake the vehicle;

wherein the control device is configured to:

simulate a vehicle speed profile for an upcoming road section if braking at a pre-identified power level by usage of the one or more auxiliary brake systems would currently be requested, thereby obtaining a predicted maximum vehicle speed for the upcoming road section and a predicted time until the vehicle reaches a vehicle speed equal to or within a preselected interval of the pre-set downhill speed for said pre-identified power level, if the predicted maximum vehicle speed is equal to or below the pre-set downhill speed and the predicted time is below a preselected threshold time limit, request braking of the vehicle by the one or more auxiliary brake systems at the pre-identified power level or at an adjusted power level, wherein the adjusted power level is derived by adjusting the pre-identified power level to compensate for a difference between said predicted maximum vehicle speed and the pre-set downhill speed.

10. The control device according to claim 9, further configured to simulate a plurality of vehicle speed profiles, each vehicle speed profile corresponding to a respective pre-identified power level.

11. The control device according to claim 9, further configured to identify one or more power levels for which a simulation of vehicle speed profile for the upcoming road section should be made.

12. The control device according to claim 9, further configured to predict whether the speed of the vehicle may be maintained equal to or below the pre-set downhill speed for the upcoming road section if braking of the vehicle by the one or more auxiliary brake systems would be requested when the pre-set downhill speed is reached.

\* \* \* \* \*